3,813,403
CATALYTIC HYDROGENATION OF KETO GROUPS IN HETEROPOLYCYCLIC COMPOUNDS
Herbert S. Aaron, Baltimore, and Louis P. Reiff, Joppa, Md., assignors to the United States of America as represented by the Secretary of the Army
No Drawing. Filed Dec. 18, 1967, Ser. No. 691,656
Int. Cl. C07d 43/06
U.S. Cl. 260—292
3 Claims

ABSTRACT OF THE DISCLOSURE

The invention relates to the method of selective catalytic hydrogenation of keto groups in heteropolycyclic compounds the steps comprising reacting at ambient temperatures heterocyclic compounds comprising keto groups in a mineral acid over a catalyst in the presence of hydrogen, after removing the catalyst the filtrate is made alkaline, extracted, and dried thus providing the hydrogenated non-keto heteropolycyclic compounds.

The compounds thus produced can be employed as intermediates in the production of antioxidants, for example.

DEDICATORY CLAUSE

The invention described herein may be manufactured, used, and licensed by or for the Government for governmental purposes without the payment to us of any royalty thereon.

SPECIFICATION

This invention relates to a new process of preparing heteropolycyclic compounds.

An object of this invention is the selective catalytic hydrogenation of the keto groups in the polycyclic compounds.

A further object of this invention is the utilization of these catalytically hydrogenated compounds as intermediates in the preparation of other known compounds.

Various methods for the preparation of heteropolycyclic compounds such as amino alcohols or other basic compounds are well known. The direct methods for the reduction of carbonyl groups to hydrocarbon groups include those of Wolff-Kishner or Clemmensen.

The reduction of the 6-β-hydroxytropinone according to the procedure of Wolff-Kishner was described by Jones et al., J. Chem. Soc., 615 (1959). The 6-β-hydroxytropan-3-one (4.16 g.) was placed in ethanol (40 cc.), heated with hydrazine hydrate (8.4 g.) at 100° C. for 2 hours and subsequently the ethanol was gradually removed by distillation. The solvents were then removed under reduced pressure and the hydrazone was heated with powdered potassium hydroxide (8.0 g.) at 100° C. for 2 hours, then at 150° C. for 1 hour. The solid residue was cooled, extracted with boiling ether which is dried over potassium carbonate and evaporated leaving the product trop-6β-ol (3.0 g.), B.P. 87°–90°. The distillate solidified and crystallized from petroleum (B.P. 40°–60°) in rhombic prisms, M.P. 65° C.

The Clemmensen process of direct hydrogenation is usually inapplicable when applied to β-keto amines in view of the rearrangements of the products.

In addition to the above named procedures, there are known lengthier indirect methods. For example, Raney nickel cleavage of the dithio ketal, or reduction to an alcohol, tosylation, and hydride reduction of the tosylate.

Our interest in the broad class of heteropolycyclic compounds was founded on the need of their use as intermediates in the synthesis of other compounds, for example, 9-amino-9-azabicyclo[3.3.1]nonane useful as an antioxidant and in analytical chemistry. The well established methods of preparing heteropolycyclic compounds were complex, time consuming, or the yields were inadequate for our requirements.

An investigation was instituted to discover new routes to prepare the desired heteropolycyclic substances. Our attention was directed to avenues which are simple, less time consuming, greater yields, and a higher purity of product.

The method comprising the steps of reacting about 1.0 to 3.0 g. of a heteropolycyclic compound comprising a carbonyl group in 50–100 ml. of a mineral acid at 0.03 to 6 N with about 0.2–3.0 g. of a catalyst for approximately 30–180 minutes at ambient temperatures under hydrogen at 25–100 p.s.i.g. pressure. The catalyst is removed and the filtrate is made basic about pH 10–12, extracted, dried over magnesium sulfate and subsequent removal of the extracting agent thus giving rise to the catalytically hydrogenated compounds:

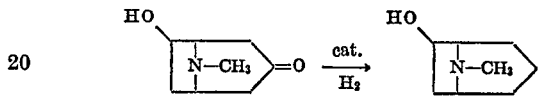

In general we found that the level of hydrogenolysis of the keto group relative to reduction to a carbinol can be markedly influenced by varying the proportion of substrate-to-catalyst or by increasing the concentration of acid. This hydrogenation level upon compounds such as 6-β-hydroxytropan-3-one can be increased from 68% to 80% to 100% when the ratio of substrate-to-catalyst varies from 5:1 to 2.1 to 1:1 based upon a weight relation while maintaining the acid concentration constant within the range of 0.03 to 6 N. In this system there was no advantage in employing an excess concentration of acid over and above that required for neutralization of the amino ketone to the corresponding hydrochloride salt.

The effect of excess acid concentration is very striking in the hydrogenation for example of 3-oxo-9,10-dimethoxy-1,2,3,4,6,7-hexahydro - 11bH - benzo[a]quinolizine. Here, without an excess of hydrochloric acid, the ratio of 4/96% of hydrogenolysis/reduction product was obtained. This ratio is to be contrasted with utilizing an excess of hydrochloric acid, i.e. 6 N, then there is a 95/5% ratio hydrogenation/reduction being substantially the inversion of ratio when no excess acid was used.

Other heteropolycyclic compounds which can be catalytically hydrogenated according to method of this invention are 3-quinuclidinone,
1-azabicyclo[2.2.1]heptan-3-one,
1-azabicyclo[3.2.1]octan-3-one,
1-azabicyclo[3.2.1]octan-4-one,
1-azabicyclo[3.2.1]octan-6-one,
tropan-3-one,
tropan-6-one,
2-oxo-9,10-dimethoxy-1,2,3,4,6,7-hexahydro-11 bH-benzo[a]quinolizine,
2-oxoindolizidine, and
pseudopelletierine.

It is not desired to limit the invention to any particular theory of action as the reaction mechanism. However, it is believed the reaction proceeds by the direct hydrogenation of the keto group to a hydrocarbon at the surface of the catalyst in view that an alcohol moiety is unchanged. The mechanism appears to be related to that proposed for the Clemmensen reduction, except β-oxo amines appear not to undergo rearrangement during the hydrogenolysis reaction, and the proximity of the ammonium function appears to be important.

The following typical examples of the invention are given by way of illustration and not by way of limitation.

EXAMPLE 1

A reaction mixture comprising about 2.0 g. of 6-β-hydroxytropan-3-one in 50 ml. of 1 N hydrochloric acid is hydrogenated over 2.0 g. platinum dioxide for about 90 minutes at room temperature in a rocking Parr apparatus at 50 p.s.i.g. hydrogen pressure. The catalyst is removed by filtration and the filtrate made basic—about pH 11—with sodium carbonate and continuously extracted overnight with chloroform. The extract is dried with magnesium sulfate and the chloroform removed under reduced pressure resulting in a colorless oil which is triturated with pentane giving rise to crystalline 6-β-tropanol. The yield is about 1.7 g., 94%.

The compound is a single component as determined by the technique of gas liquid chromatography on a Carbowax, 20 M column at 220°. The component has a M.P. 65° C. upon recrystallization from petroleum ether (B.P. 30°–60°).

Analysis.—Calcd. for $C_8H_{15}NO$: C, 68.04; H, 10.71; M.W. 141.2. Found: C, 67.8; H, 10.4; M.W. 141 (mass spec.) neut. equival. 142.

EXAMPLE 2

A reaction mixture comprising about 1.0 g. 3-oxo-9,10-dimethoxy-1,2,3,4,6,7-hexahydro-11bH - benzo[a]quinolizine in 6 N hydrochloric acid is hydrogenated over 1.0 g. platinum dioxide for about 90 minutes at room temperature in a rocking Parr apparatus at 50 p.s.i.g. hydrogen pressure. After removing the catalyst, the filtrate is made basic—about ph 11—with sodium hydroxide and extracted with chloroform. The extract is dried with magnesium sulfate, and the chloroform is removed under reduced pressure giving rise to the catalytically hydrogenated compound without any change in the methoxy moieties as demonstrated by gas chromatography. A picric acid derivative of the catalytically hydrogenated compound has a M.P. 171° C. which is identical with the literature's melting point.

EXAMPLE 3

A mixture of about 30.0 g. 9-methyl-9-azabicyclo[3.3.1]nonane obtained from hydrogenolysis of pseudopelletierine, 70.0 g. ethylchloroformate in 130 ml. absolute benzene and 260 ml. absolute benzene is heated for about 2 hours, cooled, and washed with aqueous 2 N hydrochloric acid and produces 9-(ethoxycarbonyl)-9-azabicyclo[3.3.1]nonane (I). The latter nonane (I) of about 34.0 g. in 200 ml. concentrated hydrochloric acid is heated 35 hours at 120° C. which is increased to 130° C. and subsequent distillation of the hydrochloric acid producing 9-azabicyclo[3.3.1] nonane (II).

A solution of 7.0 g. of nonane II (above) in 7 ml. water is treated with about 5.8 ml. 50% sulfuric acid at 10° to 15° C. with agitation of the mixture from 1 to 1.5 hours at 0° to 3° C. with subsequent addition of a cold solution of 19–24 g. sodium nitrite in 68 ml. of water, and the mixture is extracted with 500 ml. of ether to give 9-nitroso-9-azabicyclo[3.3.1] nonane (III).

A solution of 5.0 g. of nonane III (above) in 115 ml. ether is added in 1.5 hours at 5°–10° C. to a mixture comprising 2.75 g. lithium aluminum hydride in 50 ml. ether and the mixture is agitated for about 20 hours at room temperature, refluxed 2 hours and separating the desired 9-amino-9-azabicyclo[3.3.1] nonane·HO.

We claim:

1. The method of preparing heterocyclic compounds comprising the steps of reacting a heteropolycyclic compound containing a keto group selected from the group consisting of tropan-3-one, tropan-6-one and pseudopelletierine in a mineral acid over a platinum dioxide catalyst in the presence of hydrogen, removing the catalyst, making the residue alkaline and extracting therefrom the hydrogenated heteropolycyclic compound.

2. In the method according to claim 1, wherein the said acid is hydrochloric in a range of 0.03 to 6 N.

3. In the method according to claim 1, wherein the ratio based on parts by weight of said heteropolycyclic compounds to catalyst varies from 5:1 to 1:1.

References Cited

FOREIGN PATENTS 658,017  7/1965  Belgium ............ 260—292

OTHER REFERENCES

Fieser & Fieser, Reagents for Organic Synthesis, vol. I, John Wiley & Sons, Inc. New York, p. 410 (1967).

ALAN L. ROTMAN, Primary Examiner

U.S. Cl. X.R.

260—293.2